United States Patent
Mai et al.

(10) Patent No.: US 12,437,357 B2
(45) Date of Patent: Oct. 7, 2025

(54) SYSTEMS AND METHODS TO PERFORM 3D LOCALIZATION OF TARGET OBJECTS IN POINT CLOUD DATA USING A CORRESPONDING 2D IMAGE

(71) Applicant: Naval Information Warfare Center, Pacific, San Diego, CA (US)

(72) Inventors: Adrian Mai, San Diego, CA (US); Mark Bilinski, Vista, CA (US); Raymond Chey Provost, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 601 days.

(21) Appl. No.: 17/561,028

(22) Filed: Dec. 23, 2021

(65) Prior Publication Data

US 2023/0206387 A1   Jun. 29, 2023

(51) Int. Cl.
G06T 3/06 (2024.01)
G01S 17/89 (2020.01)
G06T 3/16 (2024.01)
G06V 20/62 (2022.01)

(52) U.S. Cl.
CPC ............... *G06T 3/06* (2024.01); *G01S 17/89* (2013.01); *G06T 3/16* (2024.01); *G06V 20/63* (2022.01)

(58) Field of Classification Search
CPC ..................................................... G06V 10/82
See application file for complete search history.

(56) References Cited

U.S. PATENT DOCUMENTS

| | | | |
|---|---|---|---|
| 11,756,317 B2* | 9/2023 | Lai | G06V 20/70 382/104 |
| 2017/0220887 A1* | 8/2017 | Fathi | G06V 20/70 |
| 2020/0210680 A1* | 7/2020 | Shreve | G06V 10/757 |
| 2022/0234623 A1* | 7/2022 | Oh | B60W 40/09 |

FOREIGN PATENT DOCUMENTS

| | | | | |
|---|---|---|---|---|
| CN | 113901903 A | * | 1/2022 | |
| EP | 3748585 A1 | * | 12/2020 | G06T 19/003 |
| KR | 20187000631 A | * | 2/2018 | |
| KR | 20240034905 A | * | 3/2024 | G06T 15/50 |

* cited by examiner

*Primary Examiner* — Di Xiao

(74) *Attorney, Agent, or Firm* — Naval Information Warfare Center Pacific; Kyle Eppele

(57) ABSTRACT

The present invention relates to a systems and methods to perform 3D localization of target objects in point cloud data using a corresponding 2D image. According to an illustrative embodiment of the present disclosure, a target environment is imaged with a camera to generate a 2D panorama and a scanner to generate a 3D point cloud. The 2D panorama is mapped to the point cloud with a 1 to 1 grid map. The target objects are detected and localized in 2D before being mapped back to the 3D point cloud.

8 Claims, 3 Drawing Sheets

---

Step 101: providing a computer vision system comprising a camera and a scanner

Step 103: identifying a class of target objects in the operating environment

Step 105: scanning the operating environment with the scanner to collect distance return values Step 107: scanning the operating environment with the camera to collect a 2D panoramic image Step 109: detecting target objects within the 2D panoramic image Step 111: mapping the distance return values to the 2D panoramic image Step 113: projecting the 2D panoramic image onto a cube map Step 115: 2D detection within individual boxes of the cube map Step 117: mapping cube map to panorama Step 119: mapping panorama to 3D point cloud Step 121: 3D localization of target data Step 101: providing a computer vision system comprising a camera and a scanner Step 103: identifying a class of target objects in the operating environment Step 105: scanning the operating environment with the scanner to collect distance return values Step 107: scanning the operating environment with the camera to collect a 2D panoramic image Step 109: detecting target objects within the 2D panoramic image Step 111: mapping the distance return values to the 2D panoramic image Step 113: projecting the 2D panoramic image onto a cube map Step 115: 2D detection within individual boxes of the cube map Step 117: mapping cube map to panorama Step 119: mapping panorama to 3D point cloud Step 121: 3D localization of target data

Fig. 3

SYSTEMS AND METHODS TO PERFORM 3D LOCALIZATION OF TARGET OBJECTS IN POINT CLOUD DATA USING A CORRESPONDING 2D IMAGE

STATEMENT REGARDING FEDERALLY SPONSORED RESEARCH OR DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 111934.

BACKGROUND OF THE INVENTION

The present invention relates to a systems and methods to perform 3D localization of target objects in point cloud data using a corresponding 2D image. Text detection and recognition in 2D are very active areas of research. A detection engine extracts regions including text. Given such a region, recognition engines convert this into machine readable text. Existing systems and methods provide a detailed survey of techniques including capturing different text size and using a rectification network to transform the image to a new feasible domain. Many systems focus on license plate or traffic sign recognition. 3D detection and localization techniques heavily depend on geometric features of the object of interest. Early stages of methods involve significant feature engineering (e.g. surface normal, border point detection, depth information from 2D). Other methods focus on feature voting in grids of 3D point cloud. At least some first generates a small number of high quality 3D proposals, then transforms the pooled points of each to canonical coordinates. Although these methods can obtain good results, they require significant computational power to process directly on 3D point clouds. A hydrid approach can use 2D detection on the image to identify and isolate a 3D frustum (akin to view cone) as the region of interest before searching the space with proposed bounding boxes. This technique reduces the search space, but is still very computationally intensive. There is a need to extract text and image information on point cloud data with a computationally fast method.

SUMMARY OF THE INVENTION

According to an illustrative embodiment of the present disclosure, a target environment is imaged with a camera (2D panorama) and a scanner (3D point cloud). The 2D panorama is mapped to the point cloud with a one-to-one grid map. The target objects are detected and localized in 2D before being mapped back to the 3D point cloud. Performing detection and localization in 2D offers a significant decrease in computation time required.

According to a further illustrative embodiment of the present disclosure, a variety of recognition algorithms can be used to detect and recognize targets objects. Exemplary embodiments can scan for and identify text, symbols, or other target objects. Exemplary embodiments are data agnostic and are capable of using a variety of formats, including unlabeled data.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 3 shows flow diagram of an exemplary method.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
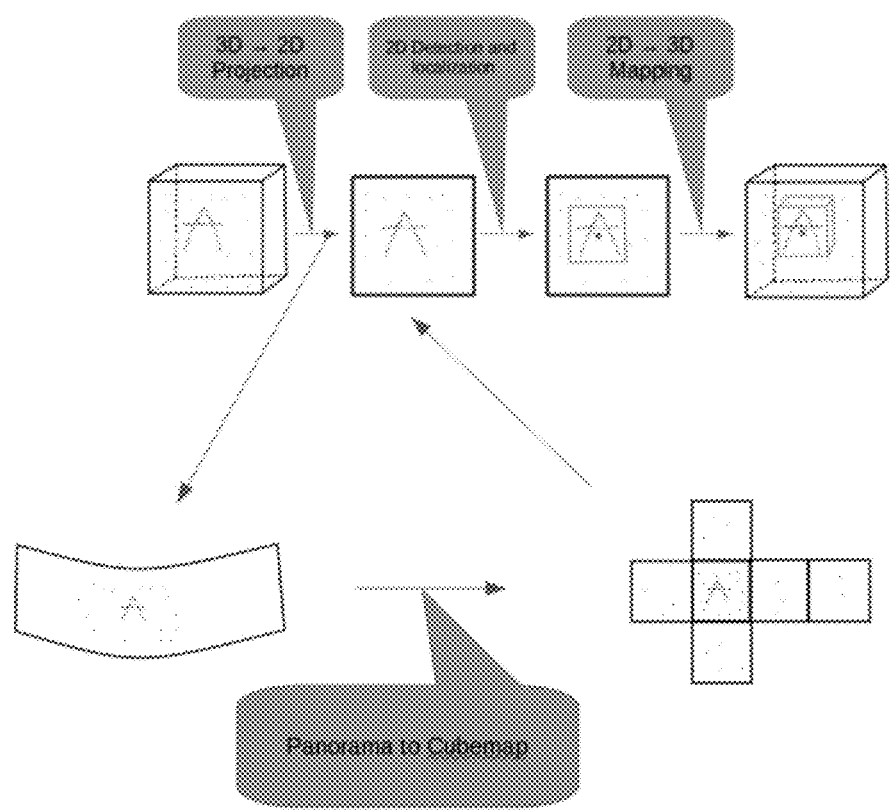
FIG. 1 shows a flow diagram of an exemplary localization method.

FIG. 1 shows a flow diagram of an exemplary localization method.

In exemplary operating environments, users need to collect 3D data for purposes of configuration management of its assets and facilities in order to improve installations and maintenance by knowing where everything is located. In exemplary embodiments, a scanner (e.g. LIDAR) sits atop a tripod and collects distance returns over a full range of vision (e.g., a full sphere minus blind spots). A second pass of the scanner can then collect photo imagery and stitch them together to provide RGB color values to each point in the point cloud and a corresponding 2D panorama image. The resulting input data is a colorized 3D point cloud and associated 2D panorama image. In exemplary embodiments, the system uses this data to create a 3D localization of target objects. Target objects can be navigation markers (e.g., location labels, name plates, safety symbols, etc.) located throughout an operating environment (e.g. a facility or building). Target objects can also include text (e.g., specific text sequences or any text sequence matching a specific text format). If the environment is relatively featureless, many spaces may look the same, and it is very easy to lose track of which direction you are facing. Humans are easily disoriented, and standard machine computer vision algorithms may suffer from similar problems. The target objects are unique objects in the environment (e.g., informational text printed on walls or other surfaces) that can allow users to approximate their current location. Exemplary algorithms identify target objects in the scans and ultimately output the 3D coordinates for their location. Subsequently, these positions can be used as known navigation references for other computer vision algorithms, enabling robotics, augmented reality, and other applications without needing to artificially adding features (e.g. QR codes) to the environment. This circumvents an unnecessary initialization step which may limit or prevent the deployment of these technologies. While significant amounts of data of this form can be collected, it is often unlabeled, which can present a challenge for detection tasks using machine learning. To leverage or develop purely 3D techniques, a point cloud would need to be labelled which can be a time and resource intensive task to perform. In comparison, 2D computer vision techniques are already mature and models have been trained extensively on large labelled datasets. The sensor already outputs a 2D panorama image and further establishes a direct correspondence between the 2D data and the 3D point cloud. Exemplary embodiments build a complete pipeline that receives unlabeled sensor data and transforms it into detected, recognized, and localized target objects in the 3D point cloud.

In exemplary embodiments, the system generates a colorized 3D point cloud of single scan and a corresponding 2D RGB panorama image from the same location, and then the system one-to-one maps that correspondence between them to generate a grid. The grid allows construction of the 2D image from the 3D point cloud and vice versa if needed. Further, if starting with just a 3D point cloud, one can construct a 2D panorama and define the grid mapping. The key concept of the exemplary method is to perform detection and localization on the 2D image instead of 3D point cloud and then transform into 3D space via grid mapping. To improve text detection and recognition, one can transform the warped panorama using equirectangular projection to cube faces. Next target detection, recognition, and 2D localization are performed using detection and recognition software (e.g., text or image recognition). In exemplary embodiments, the target objects are predetermined strings of text. In these embodiments, the text detection software can output location and orientation of boxes containing text (e.g. East Text Detector, etc.). A perspective tool (e.g., Warp function in OpenCV, etc.) can be used to straighten and crop all of the rectangles for easier recognition. The text recognition software (e.g., Tesseract OCR with Long Term Short Term Memory (LSTM), etc.) can then perform text recognition of the detected text. A user can choose unique features of the text of interest to improve accuracy (e.g., remove false positives or negatives). The detections that remain can be assumed to be various sections of the same target. If more than one detection occurs, the system can choose the two nearest centers and average their positions to obtain the predicted bullseye center. For alternative exemplary embodiments, the system can be designed to detect and recognize multiple targets within a single scan. In these embodiments, clustering techniques can be used to separate or group targets.

Exemplary embodiments use the panorama constructed by the scanner's 3D localizing software. While this gives a high quality image, it does so independent of the point cloud data. If a certain pixel does not have a corresponding 3D point associated with it, the algorithm assigns the point (0,0,0) as default. Next the system can calculate a surface normal vector at the center point. The text is on the surface of a wall and facing the scanner. Exemplary embodiments use the 5,000 nearest neighbors of the center for the calculation. Given the normal vector, to finish constructing the box, the system needs to choose a vector in the surface itself. Exemplary embodiments choose a surface vector that is as horizontally level as possible. Exemplary embodiments then construct a 3D box around the center along these vectors, with a predetermined width (e.g. 0.12 meters) along the normal vector and a predetermined length and height (0.6 meters) along the other two vectors. This approach circumvents the need for labelled training data by leveraging well developed pretrained 2D techniques. Compared with purely 3D techniques, the exemplary embodiments computational complexity is significantly lower and therefore less of a concern. As a result, the point cloud does not need to be decimated to a more manageable size. Because the 3D localization is performed directly from detected 2D features, a 3D search is not required. Performing the search on the 2D image which is comparatively small (megabyte scale) is more efficient than adding a dimension and working with a large point cloud (gigabyte scale).

Figure 2:
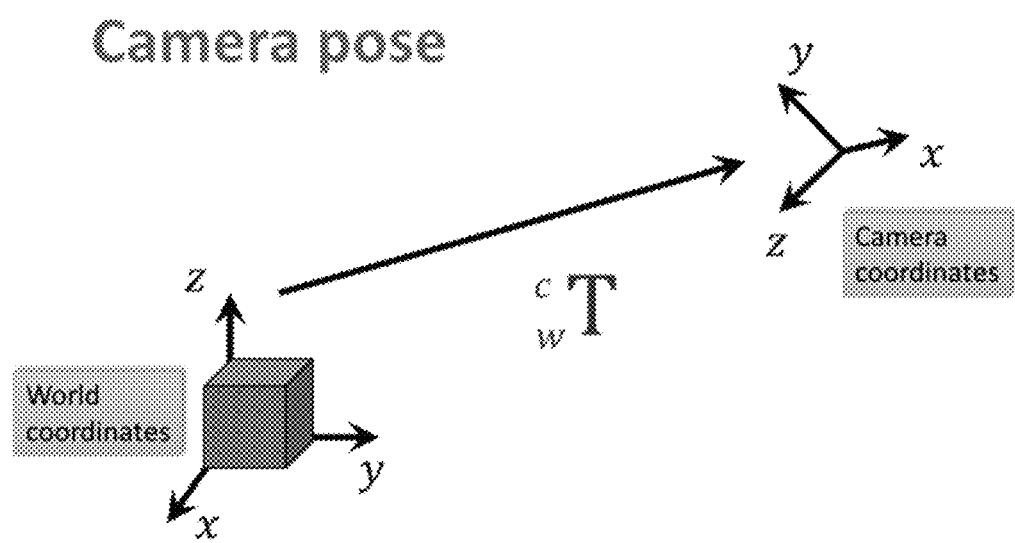
FIG. 2 shows an exemplary representative of mapping between 3D and 2D.

FIG. 2 shows an exemplary representative of mapping between 3D and 2D through the grid. The panorama and grid are outputs of 3D localization software (e.g., SCENE). However, given just a 3D point cloud, one can construct both of these directly. This could be used to adapt this technique to datasets with only a point cloud or to virtually change perspective to a non-scanner location. Assume a global coordinate system (world coordinate system) origin at (0,0,0) and the camera pose with roll, pitch and yaw information. One can take the xyz coordinate in the world coordinate (Pw) and subtract from it the location of the camera (C) to obtain the body coordinate of the 3D point cloud. In order to obtain the camera coordinate (Pc) system we need to obtain the rotation matrix (R) from the roll, pitch, and yaw, as shown in Equations 1 and 2.

$$Pc = R \cdot (Pw - C) \qquad \text{Eqn. (1)}$$

$$R = (x^2 + y^2 + z^2)^{1/2} \qquad \text{Eqn. (2)}$$

With the camera coordinates, one can reconstruct the panorama based on specs of the camera through spherical coordinate system by calculating the associated angle φ and θ as shown in Equations 3 and 4.

$$\theta = \tan^{-1}(y/x) \qquad \text{Eqn. (3)}$$

$$\varphi = \cos^{-1} z/((x^2 + y^2 + z^2)^{1/2}) \qquad \text{Eqn. (4)}$$

With the φ and θ and height H and width W, one can now construct the (u, v) pixels (grids) for the panorama image. The limits for φ and θ are camera dependent. Equations 5 and 6 show the calculation of u and v for a camera with a φ range of (0, 5π/6) and θ range of (0, 2π).

$$u = \varphi \cdot H/(5\pi/6) \qquad \text{Eqn. (1)}$$

$$v = \theta \cdot W/2\pi \qquad \text{Eqn. (1)}$$

FIG. 3 shows a flow diagram of an exemplary method. At step 101: providing a computer vision system comprising a camera and a scanner. At step 103: identifying a class of target objects in the operating environment. At step 105: scanning the operating environment with the scanner to collect distance return values. At step 107: scanning the operating environment with the camera to collect a 2D panoramic image. At step 109: detecting target objects within the 2D panoramic image. At step 111: mapping the distance return values to the 2D panoramic image. At step 113: projecting the 2D panoramic image onto a cube map. At step 115: 2D detection within individual boxes of the cube map. At step 117: mapping cube map to panorama. At step 119: mapping panorama to 3D point cloud. At step 121: 3D localization of target data.

Although the invention has been described in detail with reference to certain preferred embodiments, variations and modifications exist within the spirit and scope of the invention as described and defined in the following claims.

What is claimed:

1. A computer vision system comprising:
   a camera;
   a light detection and ranging (LIDAR) detector; and
   a processor configured to execute a plurality of machine instructions comprising:

a camera module that operates the camera to generate a 2D panoramic image;

a LIDAR module that operates the LIDAR detector to generate a 3D point cloud with distance return values;

a first mapping module that correlates the 3D point cloud to the 2D panoramic image;

a recognition module that identifies and locates at least one target object within the 2D panoramic image and generates target object data;

a second mapping module that correlates the target object data to the 2D panoramic image; and a third mapping module that correlates the target object to the 2D panoramic image and data to the 3D point cloud;

wherein the first mapping module creates a one-to-one grid map correlating the distance return values to individuals segments of the 2D panoramic image, wherein the third mapping module uses the grid map to correlate the target object data to the 3D point cloud.

2. A method of localizing target objects in an operating environment comprising:

providing a computer vision system comprising:

a camera;

a light detection and ranging (LIDAR) detector; and a processor configured to execute a plurality of machine instructions comprising:

a camera module that operates the camera to generate a 2D image;

a LIDAR module that operates the LIDAR detector to generate a 3D point cloud with distance return values;

a first mapping module that correlates the 3D point cloud to the 2D image;

a recognition module that identifies and locates at least one target object within the 2D image and generates target object data;

a second mapping module that correlates the target object data to the 2D image; and a third mapping module that correlates the target object data to the 3D point cloud;

identifying a class of target objects in the operating environment;

scanning the operating environment with the scanner to generate a 3D point cloud comprising distance return values;

scanning the operating environment with the camera to generate a 2D panoramic image;

mapping the distance return values to the 2D panoramic image;

projecting the 2D panoramic image onto a cube map;

detecting the target objects within the 2D panoramic image;

generating target object data for individual boxes of the cube map; and mapping the target object data to the 2D panoramic image and 3D point cloud.

3. The method of localizing target objects in an operating environment of claim 2 further comprising a clustering module that groups the at least one target object into at least one target group.

4. The method of localizing target objects in an operating environment of claim 2 wherein the first mapping module creates a one-to-one grid map correlating the distance return values to individual segments of the 2D panoramic image.

5. The method of localizing target objects in an operating environment of claim 2 wherein the 3D point cloud and the 2D image are comprised of unlabeled data.

6. The method of localizing target objects in an operating environment of claim 2 wherein the target objects comprise a predetermined text sequence, wherein detecting the target objects comprises searching the 2D panoramic image for text and identifying instances of the predetermined text sequence within the text.

7. The method of localizing target objects in an operating environment of claim 2 wherein the target objects comprise a predetermined text format, wherein detecting the target objects comprises searching the 2D panoramic image for text and identifying instances of the predetermined text format within the text.

8. The method of localizing target objects in an operating environment of claim 2 wherein the third mapping module uses a grid map to correlate the target object data to the 3D point cloud.

* * * * *